US008276349B2

(12) United States Patent
Van Amstel et al.

(10) Patent No.: US 8,276,349 B2
(45) Date of Patent: Oct. 2, 2012

(54) WRAPPING OF AGRICULTURAL BALES OF RECTANGULAR CROSS SECTION

(75) Inventors: Leonardus Hendrikus Maria Van Amstel, Geldrop (NL); Jacobus Izaak Van de Walle, Nuenen (NL)

(73) Assignee: Kuhn-Geldrop B.V., Geldrop (NL)

( * ) Notice: Subject to any disclaimer, the term of this patent is extended or adjusted under 35 U.S.C. 154(b) by 202 days.

(21) Appl. No.: 12/279,315

(22) PCT Filed: Jan. 30, 2007

(86) PCT No.: PCT/EP2007/000784
§ 371 (c)(1),
(2), (4) Date: Feb. 3, 2009

(87) PCT Pub. No.: WO2007/093280
PCT Pub. Date: Aug. 23, 2007

(65) Prior Publication Data
US 2009/0277136 A1    Nov. 12, 2009

(30) Foreign Application Priority Data

Feb. 15, 2006 (GB) .................................. 0602981.3

(51) Int. Cl.
*B65B 11/04* (2006.01)
*A01F 15/07* (2006.01)
(52) U.S. Cl. ................. 53/441; 53/211; 53/556; 53/587
(58) Field of Classification Search .................... 53/399, 53/441, 211, 556, 587, 588, 589
See application file for complete search history.

(56) References Cited

U.S. PATENT DOCUMENTS

| 3,216,457 | A * | 11/1965 | Zavasnik ....................... 138/111 |
| 4,905,451 | A * | 3/1990 | Jaconelli et al. ................ 53/410 |
| 6,178,723 | B1 * | 1/2001 | Mossbeck ....................... 53/450 |
| 6,393,808 | B1 * | 5/2002 | Kallner et al. .................. 53/556 |
| 6,722,110 | B1 * | 4/2004 | Royneberg ....................... 53/588 |

(Continued)

FOREIGN PATENT DOCUMENTS

EP    0 304 104    2/1989

(Continued)

*Primary Examiner* — Thanh Truong
(74) *Attorney, Agent, or Firm* — Knobbe Martens Olson & Bear LLP

(57) ABSTRACT

A method of applying stretch film wrapping to an agricultural bale (10) which is of rectangular cross section and using a bale wrapper apparatus which comprises: a table which supports the bale (10) and which operates to rotate the bale generally about its longitudinal axis (11) during a wrapping cycle; a dispenser reel arrangement (12, 13, 16, 17, 20, 21, 24, 25) from which stretch film wrapping is withdrawn so as to form successive overlapping windings of film which cover the bale; and means which applies relative rotation between the table and the dispenser reel arrangement about a second axis (14) which extends substantially perpendicular to said first axis during the wrapping cycle; in which: each winding of film includes a longitudinal edge strip portion and an adjoining longitudinal strip portion; and the longitudinal edge portion has different deformation properties from the deformation properties of said adjoining portion so as to be more readily extensible under a given load than said adjoining portion, and thereby to enable the winding to tighten itself around each corner (15) of the bale (10) and thereby at least minimize the generation of creases or wrinkles in the film winding at each corner region of the bale.

11 Claims, 4 Drawing Sheets

U.S. PATENT DOCUMENTS

| | | |
|---|---|---|
| 6,775,956 B1* | 8/2004 | Lacey .............................. 53/399 |
| 2002/0124529 A1* | 9/2002 | van der Lely .................... 53/411 |
| 2003/0175096 A1* | 9/2003 | Korhonen et al. ........... 414/24.5 |
| 2004/0121108 A1 | 6/2004 | Mass et al. |
| 2007/0081878 A1* | 4/2007 | McHale et al. .............. 414/24.5 |

FOREIGN PATENT DOCUMENTS

| | | |
|---|---|---|
| EP | 1 050 207 | 11/2000 |
| FR | 2 597 122 | 10/1987 |
| WO | WO 98/50219 | 11/1998 |

* cited by examiner

WRAPPING OF AGRICULTURAL BALES OF RECTANGULAR CROSS SECTION

RELATED APPLICATIONS

This application is the U.S. National Phase filing under 35 U.S.C. §371 of PCT/EP2007/000784, filed Jan. 30, 2007, which designated the United States and was published in English, which claims priority under 35 U.S.C. §119(a)-(d) to Great Britain Patent Application No. 0602981.3, filed Feb. 15, 2006. The contents of these applications is incorporated herein by reference in their entireties.

FIELD OF THE INVENTION

This invention relates to a method of wrapping agricultural bales of rectangular cross section with stretch film wrapping.

BACKGROUND OF THE INVENTION

The invention may be carried out by an independently operated machine i.e. which carries out bale wrapping only, or by an integrated combined baler and wrapper apparatus.

It is well known to apply stretch film wrapping to enclose agricultural bales tightly, and which may be composed of e.g. straw, hay or partly dried grass (to ferment when wrapped to form silage). Bales are usually of cylindrical shape, so-called big bales or round bales, or are of rectangular cross section (which includes square cross section). The latter are more difficult to wrap satisfactorily, by reason of the eight corners of the bale which create problems in application of stretch film wrapping when a film strip passes from planar coverage of one flat surface of the bale to an adjoining flat surface via one of the corners.

This is usually not a problem in passing from an end face to a cylindrical outer surface of a round bale, or vice versa, in that the circular edge of the round bale provides an easier transition for the film strip from one flat surface to another.

By contrast, a corner of a rectangular bale provides a smaller area only over which a small portion only of the film strip engages at high pressure, as the film strip bends through 90 degrees approximately in moving from one flat surface to another. Stretch film used to wrap bales undergoes a pre-stretching action, prior to application to the bale, and the elastic energy thereby stored in the film strip enables the stretched strip to tighten itself onto the outer surface of the bale, after application to the bale. However, while this provides satisfactory wrapping of the major part of the flat surface of the bale, there is usually a problem in providing satisfactory coverage at each corner region of a rectangular bale using conventional wrapping.

The problem which arises, using conventional wrapping techniques, when a winding which is being wrapped around a bale of rectangular cross section, and moves from one planar face of the bale to another via one of the corner regions of the bale. The winding is of substantial width, and (as will be described in more detail below with reference to FIG. 1), one of the longitudinal edges of the winding has a longer path of travel than the opposite edge portion, and therefore the edge portion which has the greater distance to travel undergoes greater elongation during the wrapping process, whereas the opposite edge portion which has the shorter distance to travel is under less tensile stress, or even zero tensile stress, and therefore tends to form wrinkles or creases in the winding which extend laterally inwardly from the edge which is required to travel the shorter distance.

Clearly, this is undesirable, in that one edge portion of the winding is under high tensile stress, whereas the opposed edge portion is under less or zero tensile stress, and there is possible risk of rupture or tearing of the edge portion under high tensile stress and/or undesirable generation of creases or wrinkles in the opposed edge portion, which has an adverse effect on the air and liquid tightness of the wrapped bale, after the wrapping process has been completed.

SUMMARY OF THE INVENTION

The invention seeks to address this problem by application of a novel means of overlapping film strip windings on the bale, in such a way as to compensate for the different lengths of travel of portions of each winding (laterally of each film strip), necessarily caused when the winding moves from one planar face of the bale to another via one of the corner regions of the bale, thereby at least minimising the generation of wrinkles in the film strip and providing satisfactory coverage of the bale.

According to the invention there is provided a method of applying stretch film wrapping to an agricultural bale which is of rectangular cross section and using a bale wrapper apparatus which comprises:

a table which supports the bale and which operates to rotate the bale generally about its longitudinal axis during a wrapping cycle;

a dispenser reel arrangement from which stretch film wrapping is withdrawn so as to form successive overlapping windings of film which cover the bale; and means which applies relative rotation between the table and the dispenser reel arrangement about a second axis which extends substantially perpendicular to said first axis during the wrapping cycle;

in which:

each winding of film includes a longitudinal edge strip portion and an adjoining longitudinal strip portion; and the longitudinal edge portion has different deformation properties from the deformation properties of said adjoining portion so as to be more readily extensible under a given load than said adjoining portion, and thereby to enable the winding to tighten itself around each corner of the bale and at least minimise the generation of creases or wrinkles in the film winding at each corner region of the bale.

Therefore the film windings are obtained from a film reel supply which is arranged so that the longitudinal edge portion of each film strip is more easy to stretch or deform (e.g. has a lower modulus of deformation, the modulus being defined as the force (N) per elongation (mm)) than the adjoining portion, and is capable of extending under load, both longitudinally of the strip, and also preferably laterally, so as to provide tight coverage of the bale at the corner regions.

In a second preferred form, the film windings are obtaining from a film reel supply which comprises two separate dispenser reels from which separate film strips can be withdrawn, and in which the reels are axially displaced one relative to the other so that the film strips are brought into partial overlap when the windings are formed such that a single thickness film forms said longitudinal edge strip portion and double thickness film forms said adjoining strip portion.

In a third preferred form, two separate dispenser reels are of different width so that the film strips are brought into partial overlap when the windings are formed such that a single thickness film forms said longitudinal edge strip portion and double thickness film forms said adjoining strip portion.

The film strips may be brought into contact with each other prior to application to the bale, or upon coming into contact with the bale, so as to form a part laminated winding.

In a fourth preferred form, the film windings are obtained from a single reel supply of film formed with a thin longitudinal edge strip portion and a relatively thicker adjoining strip portion.

In a fifth preferred form, a single film strip may be stretched laterally during the wrapping process so that one (or two) edge portion(s) is thinner than the adjoining portion and therefore extends more under a given load, again to minimise wrinkle formation at each corner region of the bale.

The film strip or strips forming the windings on the bale may have a central portion forming said adjoining strip portion, and a pair of laterally spaced edge strip portions which are more readily extensible under load than the central portion. This gives the advantage that it allows the film to be pre-stretched to a higher level.

Examples of wrapping method according to the invention will now be described in detail, with reference to the accompanying drawings in which:

DETAILED DESCRIPTION OF THE PREFERRED EMBODIMENT

Figure 1:
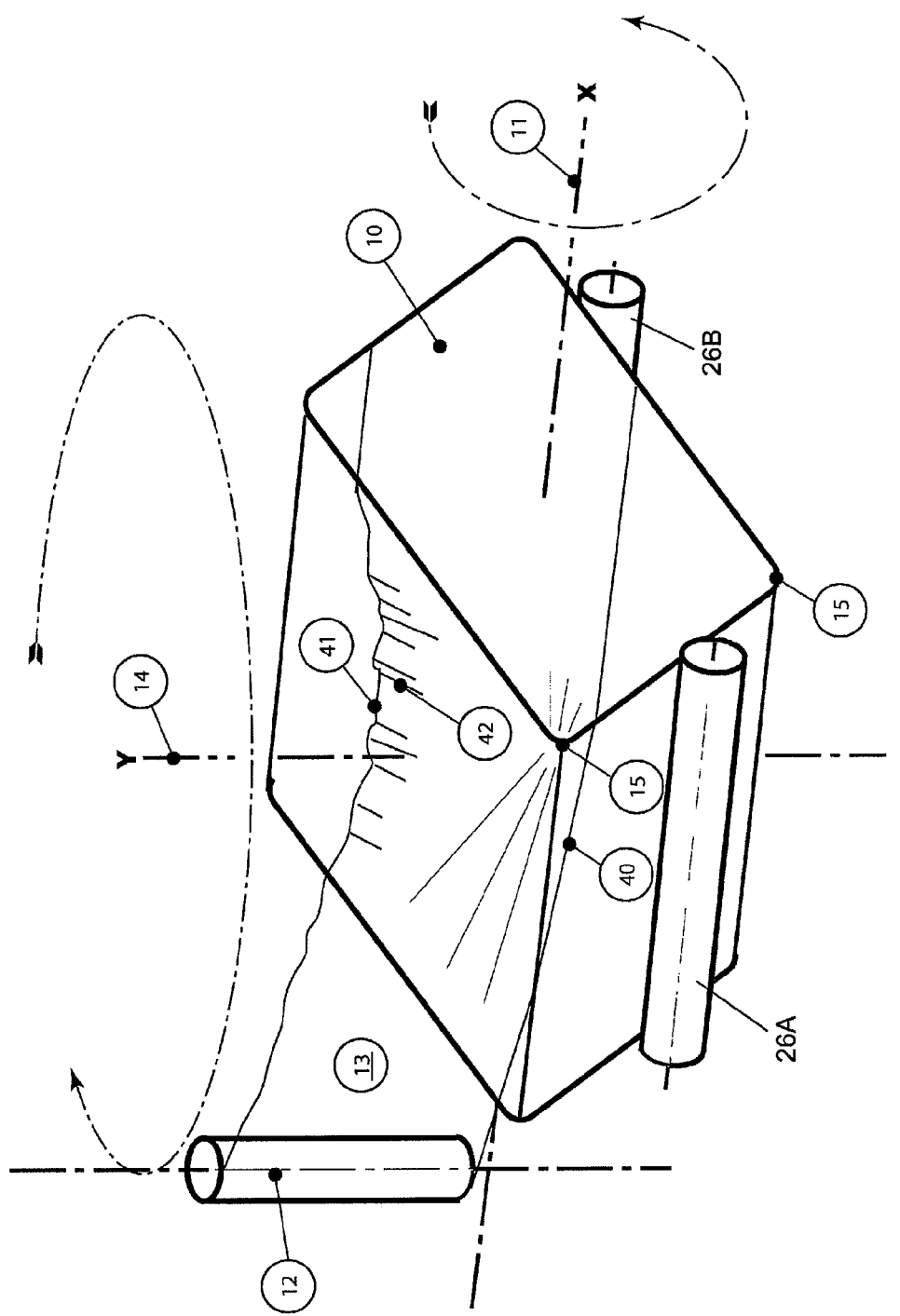
FIG. 1 is a diagrammatic and perspective illustration of a known apparatus and wrapping technique for application of stretch film wrapping to cover tightly an agricultural bale of rectangular cross section, and serving to form background to the description of preferred examples of the invention.

Referring first to FIG. 1 of the drawings, there is shown diagrammatically and in perspective illustration a typical wrapping procedure to apply stretch film wrapping to form airtight coverage of a rectangular cross section bale. Bale wrappers can be of the rotating turntable type, and satellite arm type, and which will be well known to those of ordinary skill in the art, and which will therefore not be described in detail herein. In both types of apparatus, a table is provided which supports the bale for rotation generally about its longitudinal axis, while simultaneously relative rotation takes place between a film dispenser and the table about an axis extending substantially perpendicular to the longitudinal axis of the bale (and which is usually vertical or substantially vertical when the longitudinal axis of the bale is substantially horizontal).

Figure 2:
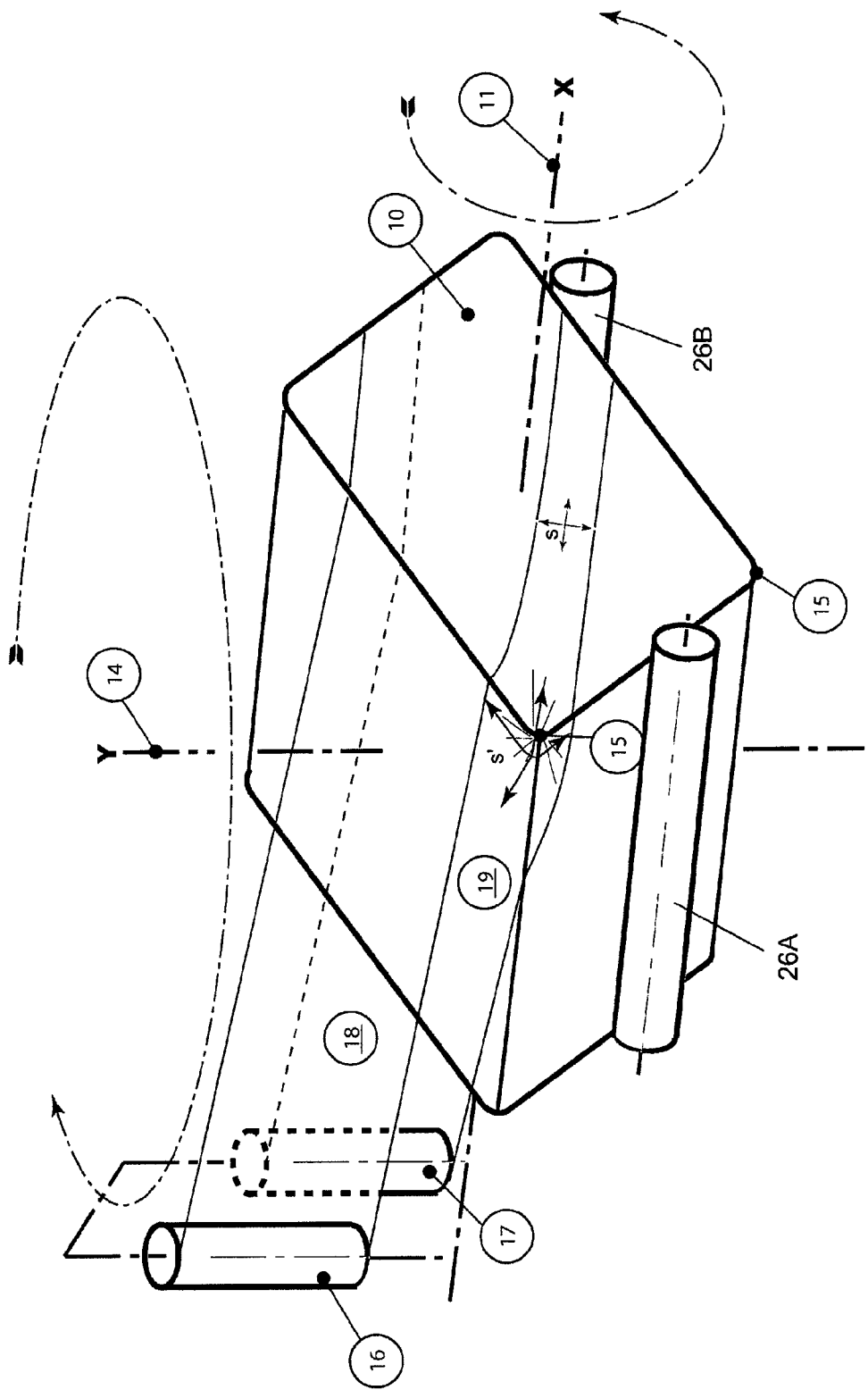
FIG. 2 is a view, similar to FIG. 1, showing one example of method according to the invention.

In FIGS. 1 and 2, the rectangular cross section bale is designated generally by reference 10, and rollers 26A and 26B and/or belts form a table on which the bale is supported to cause the bale 10 to carry out a tumbling type of rotation generally about its longitudinal axis 11 while wrapping takes place. In FIG. 1, an orbiting satellite type of film reel dispenser arrangement 12 is provided, from which a single strip of film 13 is withdrawn, as the reel 12 orbits about second vertical axis 14.

The film strip 13 is withdrawn from reel 12 under tension, and optionally a pre-stretcher arrangement (not shown) may also be provided, so that the film strip 13 applied as successive overlapping windings to the bale 10 are initially under tension, and the elastic energy stored in the pre-stretched film strip causes the windings to tighten into firm contact with the planar surfaces of the bale 10.

However, as can be seen from FIG. 1, as the winding moves from one planar end face of the rectangular bale to an adjacent one of the side faces of the bale, the winding has to negotiate one of the corner regions 15 of the bale. Clearly, one longitudinal edge 40 of the winding has to follow a longer path of travel than the opposed longitudinal edge 41, as the winding moves over the corner region 15. This therefore places the edge portion 40 under high tensile stress, whereas the opposed edge portion 41 is under less or even zero tensile stress, with resultant generation of creases or wrinkles 42 as shown.

If an attempt might be made to minimise formation of wrinkles 42 by applying greater tensile force to the overall winding, so that at least some tensile stress is applied to the edge portion 41, this then would involve the risk that the edge portion 40 would be under excessive tensile stress, with consequent risk of tearing or puncturing.

The possible formation of wrinkles or creases alongside each corner region, and the risk of tearing at the corner region itself, are substantial disadvantages to current wrapping techniques used to apply stretch film wrapping to bales of rectangular cross section. The preferred examples of the invention which will be described below seek to provide considerable improvement in one or both of these potentially adverse factors.

However, before describing in detail the examples shown in FIGS. 2 to 4, there will first be described an example without reference to drawings. In this example, within the scope of the claimed invention, the film windings are obtained from a film reel supply, similar to dispenser reel 12 in FIG. 1, in which the film is formed in such a way that the longitudinal edge portion of each film strip is made to be more easily deformable than the adjoining portion or portions, and is therefore capable of extending under load both longitudinally of the strip, and also preferably laterally, so as to provide tight coverage of the bale at the corner regions 15. In addition, the easier deformability enables the film strip to adapt itself better to the longer path of travel and thereby prevent the opposite side from forming wrinkles.

Further, in all embodiments of the invention, the width of the adjoining portion is preferably between ⅓ to ½ of the total width of the strip, so as to provide a balanced difference in deformation properties between the edge portion(s) and the adjoining (central) portion. Also, preferably the pre-stretch ratio of the strip is more than 70% so as to obtain a good tightness of the bale.

In practice, the stretch is usually limited to 50%-60%, to avoid risk of tearing the windings when negotiating the corners. Laminating the film windings from two individual strips contributes to minimising the tearing of film, since any potential tear in one of the films will not generally lead to a full break of the winding since the other strip will prevent further tearing of the film, as well as providing support for any tear in the first film. In combination with the lamination, this could be increased to 120% giving them the possibility of laying 9 (single) layers instead of 6 conventional layers both by using the same amount of film. Alternatively, film could be saved when applying fewer layers by following the teachings of the claimed invention. An alternative to possible higher stretch of the film is the use of a thinner film than the actual 25 micron film used, this being in combination with actual stretch of 50%-60%. Tests have shown that edge portions of 10 micron in combination with 20 micron inner portion of half of the width of the total width of the winding will lead to more airtight bales with even lower risk of tearing of the winding.

In a further preferred form, as shown in FIG. 2, the film windings are obtained from a film reel supply which comprises two separate dispenser reels 16 and 17 from which separate film strips 18 and 19 respectively can be withdrawn, and in which the reels 16 and 17 are axially displaced one relative to the other so that the film strips 18 and 19 are brought into partial overlap when the windings are formed, such that a single thickness film forms one longitudinal edge strip portion 30a, and double thickness film forms the adjoining strip portion 30b (see FIG. 5a). In the illustrated example, the double thickness film comprises a central portion 30b of the winding, and a pair of laterally spaced longitudinal edge strip portions 30a are formed which are more readily easily deformable than the double thickness central portion, both longitudinally, and preferably also laterally, to improve subsequent deformation of the edge portions as the windings pass from one planar surface to an adjoining planar surface via the corner region of the bale.

Figure 3:
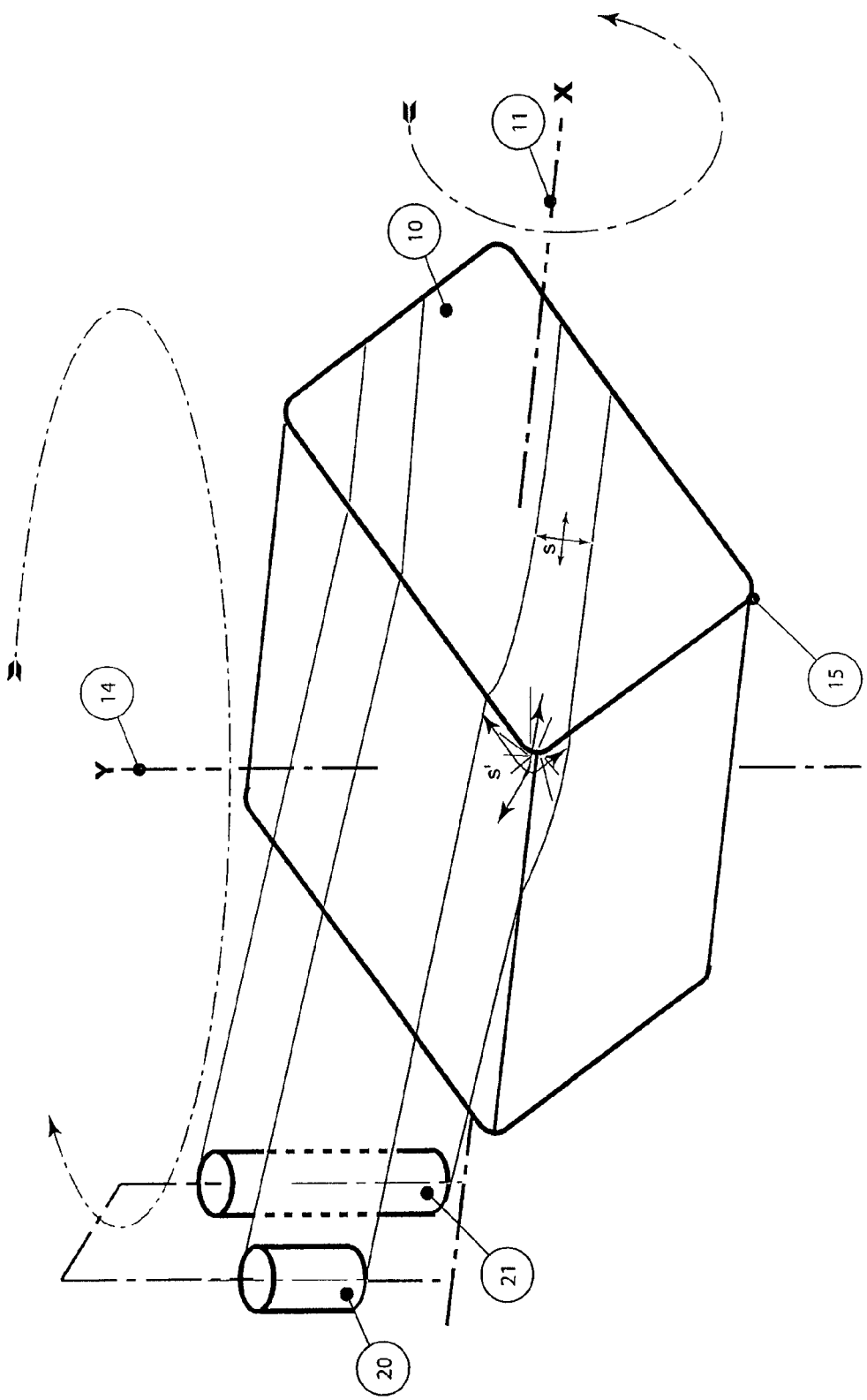
FIG. 3 is a view, similar to FIG. 2, showing a second preferred example according to the invention.

An alternative arrangement of twin dispenser reels 20 and 21 is shown in the example of FIG. 3, and which results in a film strip winding having a longitudinal edge portion and an adjoining longitudinal strip portion.

In both examples of FIGS. 2 and 3, lateral expansion of the film strip windings is shown, as the windings negotiate each corner region 15, with variation in the thickness of the more readily extensible edge portion being shown increasing from width S prior to engagement with the corner region 15, and then subsequent enlargement to $S^1$ as shown.

Figure 4:
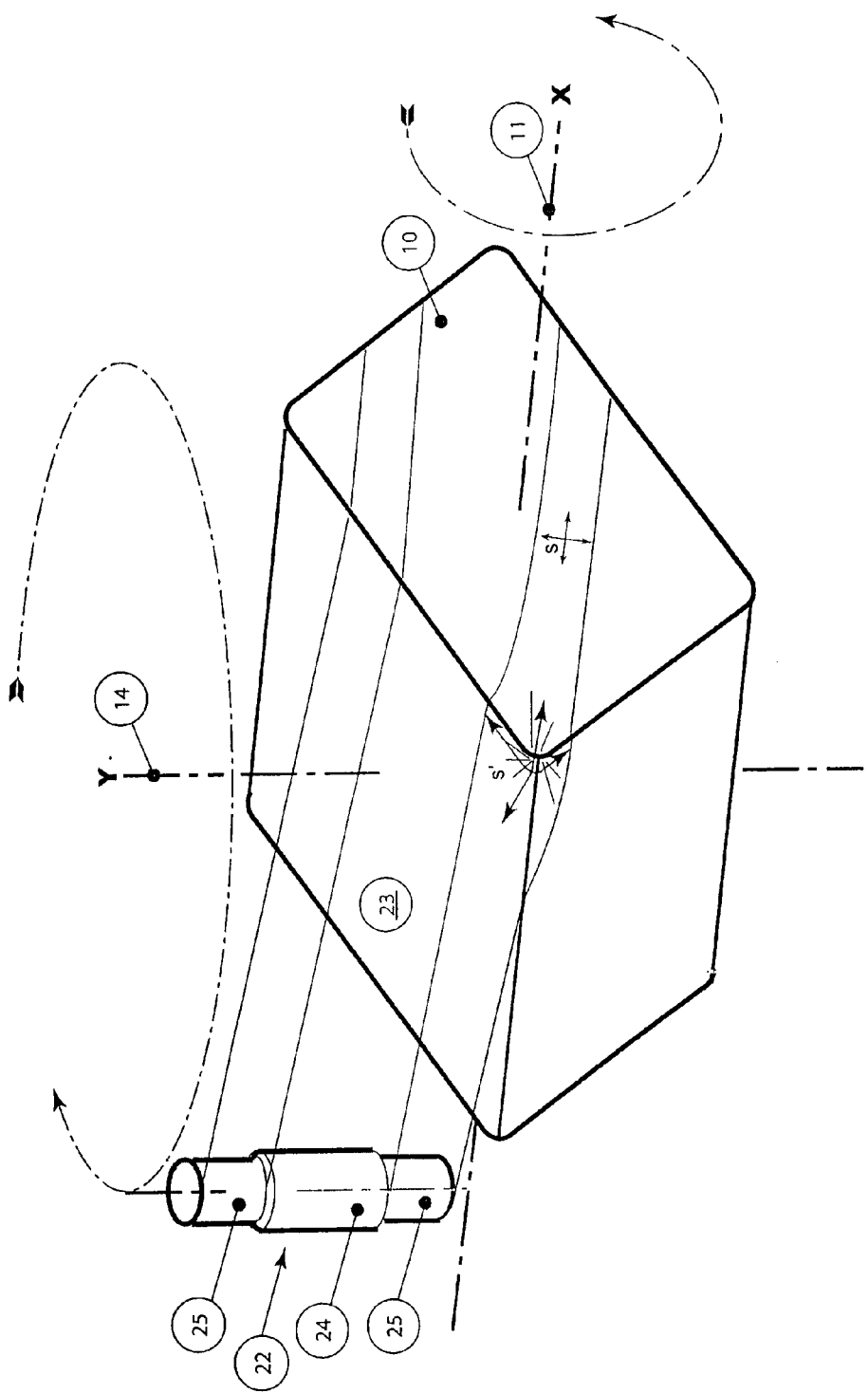
FIG. 4 shows a third example according to the invention.

In the example of FIG. 4, there is shown an alternative film reel supply 22, from which a single composite strip 23 is withdrawn, having a relatively thick central portion 24 and two adjoining laterally spaced edge strip portions 25.

In conclusion, all examples of bale wrapping method according to the invention therefore provide windings of prestretched film around the outer surface of the bale, and which subsequently shrink by the elastic energy stored in the prestretched film strips so as to form air and watertight wrapping of the bale.

Each winding of film therefore includes a longitudinal edge strip portion at least, and an adjoining longitudinal strip portion, and in which the edge strip portion has different deformation properties e.g. elastic from the properties of the adjoining portion so as to be more readily extensible under a given load (longitudinally and preferably also laterally than the adjoining portion, thereby to enable the windings to tighten themselves around each corner region of the bale, and with greatly minimised risk of creases or wrinkles being formed.

In the case of two separate film reel supplies, which are brought into at least partial overlap, this may be a laminating process, whereby the separate film strips are laminated to each other, where they overlap, to provide a stronger and less elastic intermediate portion (with respect to the more flexible edge strip portion) of the film winding.

The invention claimed is:

1. A method of applying stretch film wrapping to an agricultural bale which is of rectangular cross section using a bale wrapper apparatus which comprises:
    supporting the bale on a table;
    rotating the bale generally about its longitudinal axis during a wrapping cycle;
    withdrawing separate film strips from a plurality of film reels and bringing the film strips into partial overlap to form a film wrapping, said film wrapping comprising a longitudinal edge strip portion comprising a single thickness film, which wraps around at least one corner of said bale, and an adjoining longitudinal strip portion comprising a double thickness film, wherein the longitudinal edge portion has different deformation properties from the deformation properties of said adjoining portion so as to be more readily extensible under a given load than said adjoining portion, such that said stretch film wrapping wraps around said corner in a manner that at least reduces creases or wrinkles in the film winding;
    forming successive overlapping windings of the film wrapping so as to cover the bale; and
    applying relative rotation between the table and the dispenser reel about a second axis which extends substantially perpendicular to said first axis during the wrapping cycle.

2. A method according to claim 1, in which the reels are axially displaced one relative to the other so that the film strips are brought into partial overlap to form the film wrapping such that a single thickness film forms said longitudinal edge strip portion and double thickness film forms said adjoining strip portion.

3. A method according to claim 2, in which the film strips are brought into contact with each other prior to application to the bale, or upon coming into contact with the bale, so as to form a part laminated winding.

4. A method according to claim 1, in which the film wrapping is obtained from two film reel supplies, of which one supply is wider than the other, and from which separate film strips are withdrawn, and are brought into partial overlap to form the film wrapping such that a single thickness film forms said longitudinal edge strip portion and double thickness film forms said adjoining strip portion.

5. A method according to claim 1, in which the film wrapping forming the windings on the bale has a central portion forming said adjoining strip portion, and a pair of laterally spaced edge strip portions which are more readily extensible under load than the central portion.

6. A method according to claim 1, in which the width of said adjoining portion is between ⅓ and ½ of the overall width of the applied film winding.

7. A method according claim 1, in which the pre-stretch applied to the film wrapping, prior to application of the windings to the bale, is more than 70% of the unstretched film length.

8. A method according to claim 7, in which the stretch level is at least 120% of the unstretched film length.

9. A method according to claim 1, in which the edge portion is less than 17 microns in thickness, and the adjoining portion is double the thickness of the edge portion.

10. A method according to claim 9, in which the edge portion is 10 microns in thickness or less, and the adjoining portion is about double the thickness of the edge portion.

11. A bale wrapper apparatus for applying stretch film wrapping to an agricultural bale of rectangular cross section, the bale wrapper apparatus comprising:
    a table which supports the bale and operates to rotate the bale generally about its longitudinal axis during a wrapping cycle;
    a dispenser reel arrangement comprising a plurality of reels from which stretch film strips are withdrawn and brought together in partial overlap to form a film wrapping, wherein said film wrapping comprises a longitudinal edge strip portion comprising a single thickness film and an adjoining longitudinal strip portion comprising a double thickness film, the longitudinal edge portion wrapping around at least one corner of said bale, and having different deformation properties from the deformation properties of said adjoining portion so as to be more readily extensible under a given load than said adjoining portion, such that said stretch film wrapping wraps around said corner in a manner that at least reduces creases or wrinkles in the film winding; and
means for applying relative rotation between the table and the dispenser reel arrangement about a second axis which extends substantially perpendicular to said first axis during the wrapping cycle so as to form successive overlapping windings of film wrapping which cover the bale.

* * * * *